US008948396B2

(12) United States Patent
Kruegel et al.

(10) Patent No.: US 8,948,396 B2
(45) Date of Patent: Feb. 3, 2015

(54) METHOD FOR A COMMUNICATION DEVICE TO OPERATE WITH MULTIPLE KEY MANAGEMENT FACILITIES

(75) Inventors: Chris A. Kruegel, Plainfield, IL (US); Thomas J. Senese, Schaumburg, IL (US); Timothy G. Woodward, Tempe, AZ (US)

(73) Assignee: Motorola Solutions, Inc., Schaumburg, IL (US)

( * ) Notice: Subject to any disclaimer, the term of this patent is extended or adjusted under 35 U.S.C. 154(b) by 602 days.

(21) Appl. No.: 13/008,251

(22) Filed: Jan. 18, 2011

(65) Prior Publication Data

US 2012/0183143 A1    Jul. 19, 2012

(51) Int. Cl.
*H04L 9/00* (2006.01)
*H04L 9/08* (2006.01)
*H04L 9/16* (2006.01)
*H04L 29/06* (2006.01)
*H04W 12/04* (2009.01)

(52) U.S. Cl.
CPC .............. *H04L 9/088* (2013.01); *H04L 9/083* (2013.01); *H04L 9/16* (2013.01); *H04L 63/062* (2013.01); *H04W 12/04* (2013.01); *H04L 2209/80* (2013.01)
USPC ......................................................... 380/277

(58) Field of Classification Search
USPC ......................................................... 380/277
See application file for complete search history.

(56) References Cited

U.S. PATENT DOCUMENTS

| 5,150,408 | A  | * | 9/1992 | Bright .......................... 380/273 |
| 7,756,272 | B2 | * | 7/2010 | Kocher et al. ................. 380/202 |
| 2011/0026714 | A1 | * | 2/2011 | Thomas et al. ............... 380/278 |
| 2011/0135097 | A1 | * | 6/2011 | Redfern et al. ............... 380/279 |

OTHER PUBLICATIONS

Mark Hartong, Rajni Goel, Duminda Wijesekera, Key Management Requirements for Positive Train Control Communications Security, Apr. 2006, ASME, pp. 253-262.*
ANSI/TIA/EIA-102.AACA-2001 Standard; Project 25; Digital Radio Over-The-Air (OTAR) Protocol; Apr. 12, 2001; 216 Pages.
Tim Woodward, "Key Management Functional Requirements and Primary/Secondary KMF Architecture", Jan. 19, 2010; 13 Pages.

* cited by examiner

*Primary Examiner* — Esther Benoit
(74) *Attorney, Agent, or Firm* — Valerie M. Davis

(57) ABSTRACT

A method for operating with KMFs includes a communication device having a memory device: receiving a designation of a primary KMF for the communication device, wherein only one primary KMF is designated for the communication device at any given time instance; receiving a designation of a secondary KMF for the communication device; storing, within the memory device, a first and a second set of crypto groups, wherein each crypto group within each set of crypto groups comprises at least one keyset, wherein each set of crypto groups is associated, within the memory device, to only one KMF identifier; associating, within the memory device, the first set of crypto groups to an identifier for the primary KMF; and associating, within the memory device, the second set of crypto groups to an identifier for the secondary KMF.

8 Claims, 6 Drawing Sheets

| Type of Commands | KM Action (OTAR) | Single-Map Architecture | |
|---|---|---|---|
| | | Primary KMF | Secondary KMF |
| Mandatory OTAR Commands | Change RSI | All: I-RSI; Own: MN, G-RSIs | Own: MN, G-RSIs |
| | Changeover | Own (option: All) | Own |
| | Delete-Key | Own (option: All) | Own |
| | Hello | n/a | n/a |
| | Modify-Key | Own (option: All) | Own |
| | No service | n/a | n/a |
| | Rekey | Own (option: All) | Own |
| | Warm-Start | Own | Own |
| | Zeroize | All | D/C (option: All) |
| Optional OTAR Commands | Capabilities | n/a | n/a |
| | Delete-Keyset | Own (option: All) | Own |
| | Deregistration | n/a | n/a |
| | Inventory | All | All |
| | Key-Assignment | Own (option: All) | Own |
| | Modify-Keyset-Attributes | Own (option: All) | Own |
| | Registration | n/a | n/a |
| | Set-Date-Time | All | n/a (option: All) |

FIG. 3

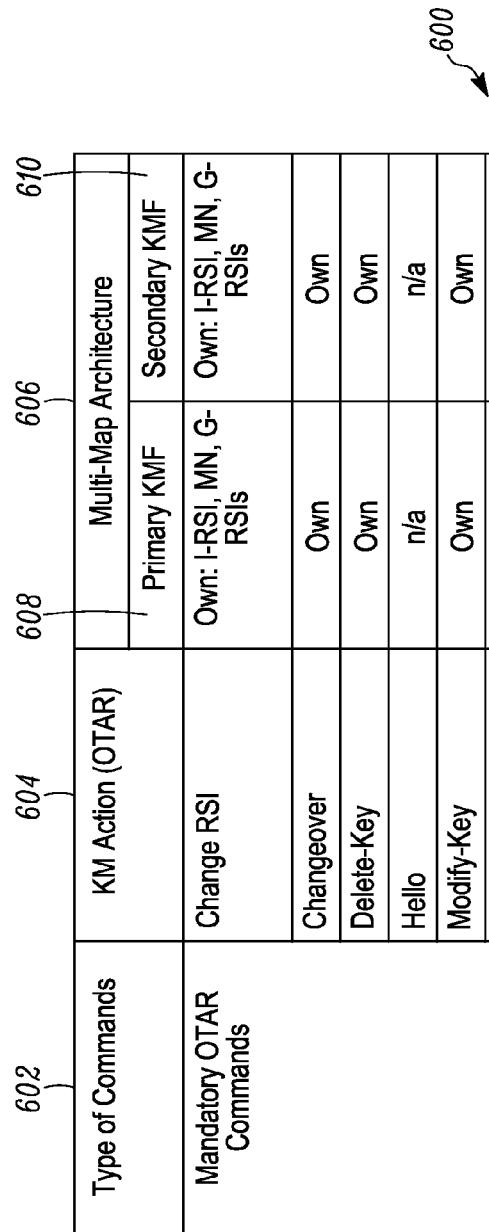

FIG. 6

| Type of Commands | KM Action (OTAR) | Multi-Map Architecture | |
|---|---|---|---|
| | | Primary KMF | Secondary KMF |
| Mandatory OTAR Commands | Change RSI | Own: I-RSI, MN, G-RSIs | Own: I-RSI, MN, G-RSIs |
| | Changeover | Own | Own |
| | Delete-Key | Own | Own |
| | Hello | n/a | n/a |
| | Modify-Key | Own | Own |
| | No service | n/a | n/a |
| | Rekey | Own | Own |
| | Warm-Start | Own | Own |
| | Zeroize | All | Own (option: All) |
| Optional OTAR Commands | Capabilities | n/a | n/a |
| | Delete-Keyset | Own | Own |
| | Deregistration | n/a | n/a |
| | Inventory | Own | Own |
| | Key-Assignment | Own | Own |
| | Modify-Keyset-Attributes | Own | Own |
| | Registration | n/a | n/a |
| | Set-Date-Time | All | n/a (option: All) |

METHOD FOR A COMMUNICATION DEVICE TO OPERATE WITH MULTIPLE KEY MANAGEMENT FACILITIES

TECHNICAL FIELD

The present disclosure relates generally to communication systems and in particular to a method for a communication device to operate with multiple key management facilities.

BACKGROUND

Efficient, reliable, and real-time communication with minimal latency is a critical requirement for public safety organizations and first responders. Inasmuch, the Telecommunications Industry Association (TIA) adopted and standardized a suite of Land Mobile Radio (LMR) standards for interoperability termed Project 25 (P25), as described for example, in the TIA 102-series documents. The emerging P25 standard defines the operation and interfaces of P25-compliant radio systems. Specifically, and in part, the P25 standard defines a standard for a Digital Radio Over-the-Air Rekeying (OTAR) Protocol as described in TIA/EIA (Electronic Industries Alliance)-102.AACA, approved Apr. 12, 2001. Within the existing art, including within the OTAR protocol, it is known for a communication device to receive key material and key management commands to act on the key material from a single key management facility (KMF). However, there are some instances in which it may be beneficial for a communication device to be able to operate with and receive key material and key management commands from multiple KMFs.

Accordingly, what is needed is a method for a communication device to operate with multiple KMFs.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

FIG. 3 is a table showing various OTAR commands carried out by a primary KMF and a secondary KMF using the single key map structure in accordance with various embodiments.

FIG. 6 is a table showing various OTAR commands carried out by a primary KMF and a secondary KMF using the multiple key map structure in accordance with various embodiments.

Figure 1:
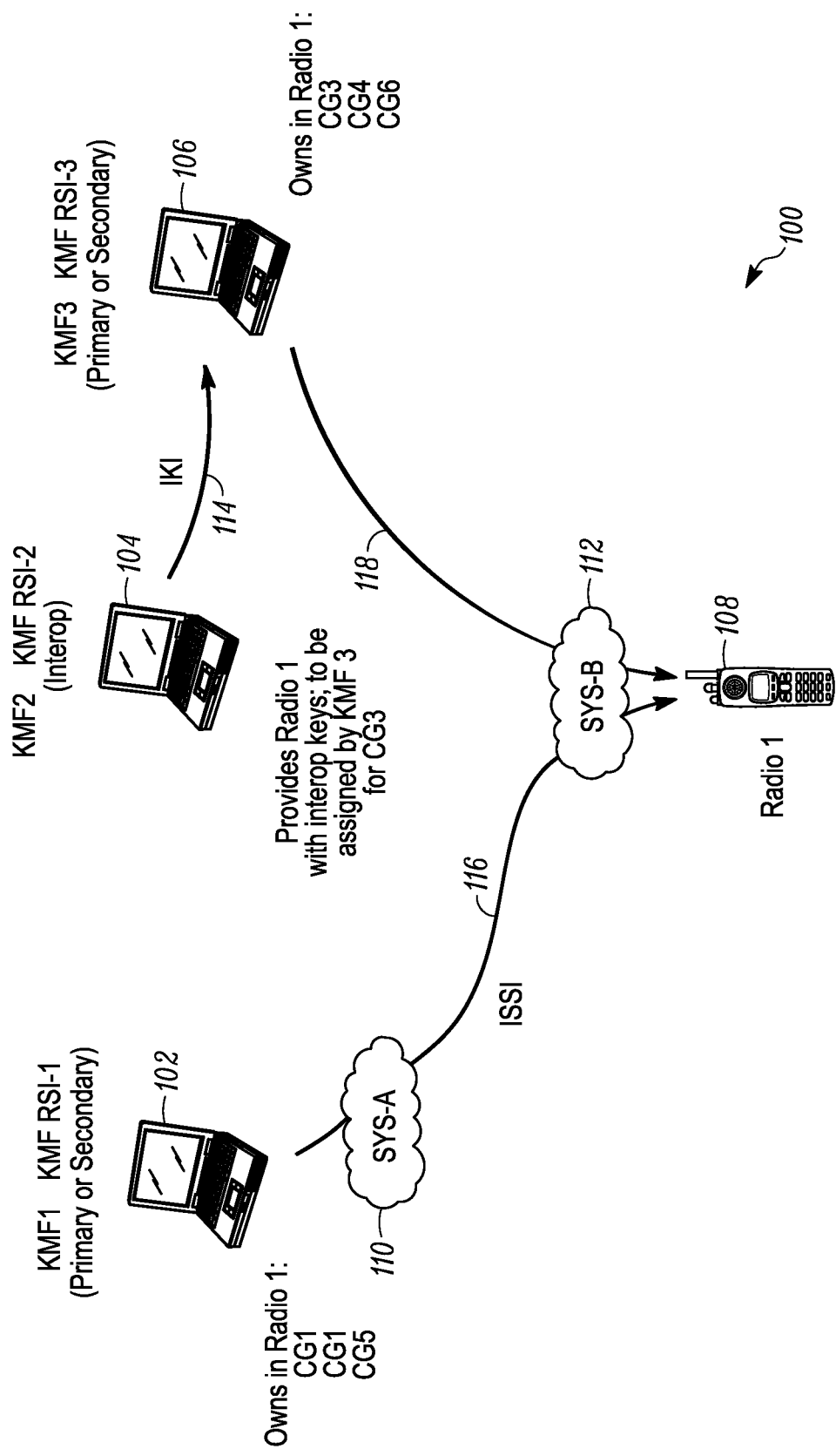
FIG. 1 is a system diagram illustrating a communication device operating with multiple KMFs in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method for operating with multiple key management facilities (KMF) includes a communication device having a memory device: receiving a designation of a primary KMF for the communication device, wherein the communication device is configured to act on key management commands from the primary KMF regardless of a registration state of the communication device with the primary KMF, wherein only one primary KMF is designated for the communication device at any given time instance; receiving a designation of a secondary KMF for the communication device; storing, within the memory device, a first and a second set of crypto groups, wherein each crypto group within each set of crypto groups comprises at least one keyset, wherein each set of crypto groups is associated, within the memory device, to only one KMF identifier; associating, within the memory device, the first set of crypto groups to an identifier for the primary KMF; and associating, within the memory device, the second set of crypto groups to an identifier for the secondary KMF.

Figure 2:
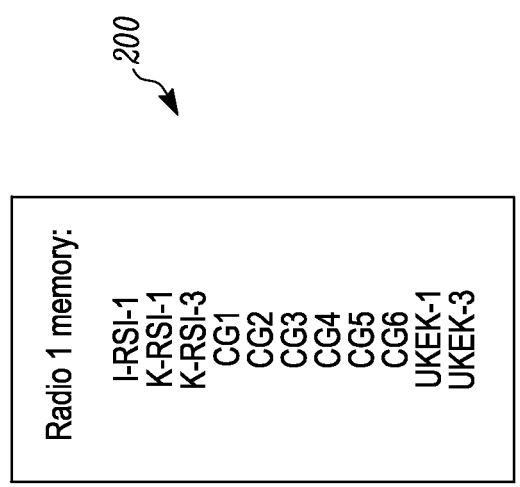
FIG. 2 is a single key map structure stored within a communication device to enable the communication device to operate with multiple KMFs in accordance with various embodiments.

Referring now to the figures, FIG. 1 illustrates a communication system 100 that provides a general depiction of a physical implementation of various embodiments of the present disclosure, for example, by reference to FIGS. 2-3. The system 100 includes a KMF1 (102), a KMF2 (104), and a KMF3 (106). A communication device 108 (a radio1) operates with multiple KMFs over a network 110 (SYS-A) and a network 112 (SYS-B), in accordance with the present teachings. Networks 110 and 112 are wireless networks that include elements such a P25 Radio Frequency Subsystem (RFSS) having base stations, repeaters, home location registers (HLRs), visitor location registers (VLR), etc. (not shown) that facilitate wireless communications and P25 interoperability between KMFs 102 and 106 and communication device 108. Accordingly, in an embodiment, the communication device 108 and the KMFs are P25 compliant (i.e., they operate in accordance with one or more of the P25 standards documents); and the key management facilities 102, 104, and 106 are configured to perform at least some of the P25 key management procedures as described in TIA/EIA-102.AACA. However the present teachings are not limited to this illustrative P25 embodiment but apply to any communication system having multiple KMFs that communicate with a single communication device, regardless of the over-the-air protocols or the key management procedures implemented in the system.

Devices in the system 100, including the KMFs and the communication device 108 and other well known infrastructure devices (not shown) in the network 110 and 112, generally include a memory (also referred to herein as a memory device), one or more network interfaces, and a processing device or processor (although not shown) that are operatively coupled, and which when programmed form the means for the device to implement its functionality, for example, as illustrated by reference to the methods and diagrams shown in FIGS. 2, 3, 5, and 6.

The network interfaces are used for passing signaling, also referred to herein as messaging, (e.g., messages, packets, datagrams, frames, superframes, or any other information blocks) between the elements of the system 100. The implementation of the network interfaces in a given device depends on the particular type of network, i.e., wired and/or wireless, to which the device is connected. For example, where the network supports wired communications, the interfaces may comprise a serial port interface (e.g., compliant to the RS-232 standard), a parallel port interface, an Ethernet interface, a USB interface, and/or a FireWire interface, and other well known interfaces. For instance, in one implementation, KMF2 and KMF3 communicate via wired interfaces.

Where the network supports wireless communications (such as networks 110 and 112), the network interfaces comprise elements including processing, modulating, and transceiver elements that are operable in accordance with any one or more standard or proprietary wireless over-the-air interfaces, wherein some of the functionality of the processing, modulating, and transceiver elements may be performed by means of the processing device through programmed logic such as software applications or firmware stored on the memory device of the system element or through hardware.

In addition to the above-mentioned functionality, implemented via programmed logic or code, the processor of a given device may be further programmed with software or firmware logic or code for performing signaling and functionality to facilitate methods in accordance with the teachings disclosed herein, such as, among others, methods described by reference to FIGS. 2, 3, 5, and 6. Furthermore, the processing device may be implemented in hardware, for example, as a state machine or an application specific integrated circuit, "ASIC" to perform such functionality. The memory in a device includes any readily recognizable combination of short-term and long-term storage of software or firmware for programming the processing device with the logic or code needed to perform its functionality and for storage of various data needed for the functioning of the device.

Turning now to a description of the various elements shown in FIG. 1, the communication device 108 is also referred to in the art as a subscriber, a user equipment, an access device, an access terminal, a mobile station, a mobile subscriber unit, a mobile device, a user device, and the like. Communication device 108 can be any type of communication device such as a radio, a mobile phone, a mobile data terminal, a Personal Digital Assistant (PDA), a laptop, a two-way radio, a cell phone, and any other device capable of operating in a wired or wireless environment and that can be used by public users or private users. Moreover, although only a single communication device is shown in FIG. 1, a communication system 100 typically includes multiple communication devices that may form one or more logical communication groups.

Each of the KMFs 102, 104, and 106 in system 100 are at least operable and configured to facilitate secure key management and distribution, wherein a key (also known in the art as a cryptographic variable) is defined as a parameter used in conjunction with a cryptographic algorithm that is used to perform a cryptographic transformation. Examples of keys managed and distributed by the KMFs 102, 104, and 106 are key encryption keys or "KEKs" (defined as keys used only to encrypt other keys) and traffic encryption keys or "TEKs" (defined as keys used to encrypt voice or data traffic).

In the architecture shown in FIG. 1, KMF 102 owns, in Radio1, a crypto group1 ("CG1"), a CG2, and a CG5. As used herein, a crypto group means a grouping of one or more keysets consisting of the same types of keys; only one keyset within a crypto group is active at any given time. A keyset is defined as a group of keys that will be used within a communication device for the same cryptoperiod, and a cryptoperiod is a time span during which an encryption key remains valid for use. A KMF owning a crypto group in a communication device means that the KMF manages and distributes the keys for each keyset within the crypto group using one or more key management commands sent to the communication device within one or more key management messages (KMMs).

The KMMs are wirelessly sent from the KMF 102 to the communication device 108 using networks 110 and 112. For instance, when communication device 108 is within the coverage area of network 110, the communication device 108 wirelessly communicates with the KMF 102 via an RFSS within the network 110. However, once that communication device is within the coverage area of network 112, the communication device 108 wirelessly communicates with the KMF 102 via the RFSS within the network 110 and an RFSS within the network 112, over a P25 Inter RF Subsystem Interface (ISSI) 116. The ISSI 116 enables the RFSSs within networks 110 and 112 to be connected into a wide area network to provide extended coverage area for the communication device 108 (and other communication devices connected to the system) as these devices roam within the communication system 100.

KMF 106 owns, in Radio1, a CG3, a CG4, and a CG6 and, therefore, manages and distributes the keys for each keyset within these three crypto groups using one or more key management commands sent to the communication device 108 within one or more KMMs. The KMMs are wirelessly sent from the KMF 106 to the communication device 108 using network 112. For instance, when communication device 108 is within the coverage area of network 112, the communication device 108 wirelessly communicates with the KMF 106 over a link 118 and via the RFSS within the network 112. In the architecture shown in FIG. 1, the KMF 104, does not communicate directly with communication device 108 (i.e., this KMF cannot send KMMs with key management commands directly to the communication device 108) and therefore does not own any crypto groups. Instead, the KMF 104 is accordingly termed herein as an "interop" KMF, which provides keys to be assigned by KMF 106 to CG3. The KMF 104 provides keys to the KMF 106 over a P25 inter-KMF interface (IKI 114) as defined in the P25 standards. This key management architecture that includes the interop KMF simplifies management of radio identifiers; namely, each "regular", e.g., public safety agency, KMF manages its own radios (e.g., radios within that agency), and the interop is not required to be provisioned with radio identifiers.

KMF 102 is identified by a KMF identifier, that in this P25 system implementation is a KMF Radio Set Identifier (RSI), shown in FIG. 1 as KMF RSI-1. KMF 104 is identified by a KMF identifier KMF RSI-2, and KMF 104 is identified by a KMF identifier KMF RSI-3. Within a key management architecture, in accordance with the present disclosure, wherein multiple KMFs within a communication system communicate and operate with a single communication device, a single one of those KMFs is designated or allocated as a primary KMF at any given time instance. Whereas, one or more of the other KMFs within the communication system is designated as a secondary KMF.

A primary KMF for a particular communication device is a KMF that is, at the least, always (i.e., without restrictions) allowed to zeroize the keys contained in each keyset of every crypto group for that communication device regardless of which KMF owns the crypto groups. Stated another way, the primary KMF is always allowed (through configuration, programming, or settings within the communication device) to zeroize the keys contained in each keyset of the crypto groups that it owns as well as each keyset of the crypto groups owned by all of the other KMFs within the communication system to which the communication device directly communicates. Accordingly, when the communication device receives a zeroize command from its primary KMF, the communication device acts on the zeroize command without restriction by deleting the keys in the keysets of all of the crypto groups used by or configured into the communication device.

By contrast, a communication device is optionally configured to allow the secondary KMF to zeroize the keys contained in each keyset of every crypto group for that communication device regardless of which KMF owns the crypto groups. Accordingly, when the communication device receives a zeroize command from a KMF designated as a secondary KMF, the communication device determines a configuration option setting for the communication device for acting on the zeroize command sent from the secondary KMF; and depending on the configuration option setting, acts on the zeroize command by either deleting the keys in the keysets of all of the crypto groups or by deleting only the keys in the keysets of the crypto groups owned by that secondary KMF.

Moreover, with respect to many non-zeroize commands (e.g., as shown by reference to FIG. 3 for instance), when the communication device receives the non-zeroize command, the communication device performs an action required by the non-zeroize command only with respect to the crypto groups owned by the KMF sending the non-zeroize command This applies whether the KMF is a primary or a secondary KMF.

A primary KMF may be further authorized or allowed via communication device configuration to perform one or more other key management commands for all of the keys within all of the keysets of all of the crypto groups in a communication device, for instance, as illustrated by reference to FIG. 3 and as explained below in more detail. A key management command is defined as an instruction from a KMF (e.g., contained within a KMM) for a communication device to perform a key management operation on one or more keys within one or more crypto groups for the communication device. An example of a key management command is the zeroize command mentioned earlier, and other key management commands are shown in FIG. 3, for instance.

Another difference that can exist (depending on system implementation) between the primary KMF and a secondary KMF is that the communication device is configured to act on key management commands from the primary KMF regardless of a registration state of the communication device with the primary KMF (i.e., whether or not the communication device is registered with the primary KMF). By contrast, in an embodiment, the communication device is optionally configured to act on key management commands from the secondary KMF only when registered to the secondary KMF, wherein any suitable registration procedure such as a P25 registration procedure can be used. Also, in one example embodiment when multiple KMFs are designated in the communication device as a secondary KMF, the communication device can receive and process a KMM from only one secondary KMF at any given time, which is the secondary KMF to which the communication device is currently registered.

As shown in FIG. 1, the KMF 104 is an interop KMF that does not have direct communication with the communication device 108. That is, the KMF 104 cannot generate and send to the communication device 108 KMMs with key management commands for managing keys contained in one or more crypto groups owned by the KMF. By contrast, either the KMF 102 or the KMF 106 is designated (through configuration) in the communication device 108 as the primary KMF for the communication device, and the other KMF is designated the secondary KMF. In an implementation where additional KMFs are included in the system, the communication device 108 can be configured with a designation of multiple secondary KMFs.

In accordance with embodiments of the present disclosure, a communication device (e.g., radio1) is configured to operate with multiple KMFs. To accomplish this, the communication device is provisioned (i.e., configured or programmed) with and thereby stores within a memory device in the radio multiple KMF identifiers, e.g., KMF RSIs, comprising a different (i.e., unique) KMF identifier for each KMF with which the communication device directly communicates by generating and sending KMMs with key management commands to the communication device for one or more crypto groups owned by the KMF. One of the KMF identifiers is designated through provisioning as the primary KMF identifier, while each of the other (one or more) KMF identifiers provisioned in the radio is designated as a secondary KMF. Moreover, the communication device stores, within the memory device, multiple sets of crypto groups (with a set having one or more crypto groups), wherein each set of crypto groups is associated or bound, within the memory device, to a different one of the KMF identifiers provisioned in the communication device. In this manner, each crypto group that is used by the communication device is associated with a single KMF RSI, wherein the association of a KMF RSI to a crypto group is performed through configuration of the communication device.

For example, in accordance with a first embodiment of the present disclosure, the communication device associates, within the memory device, the provisioned KMF identifiers and their associated sets of crypto groups with a single key management identifier (e.g., a P25 I-RSI) for the communication device. Stated another way, each KMF with which the communication device directly communicate uses the same I-RSI to identify the communication device for key management purposes. This first embodiment is illustrated by reference to FIGS. 1 to 3. More particularly, FIG. 2 shows an illustrative architecture for a single key map structure 200 stored in a memory device of the communication device and used by the communication device to operate with multiple KMFs in accordance with the teachings herein. As can be seen, this single key map has included therein only one I-RSI, which is associated with the unique K-RSI-1 and KRSI-3 provisioned in the communication device for KMFs 102 and 106, respectively.

Further shown is the set of crypto groups (which includes CG1, CG2, and CG5) owned by KMF 102 and the set of crypto groups (which includes CG3, CG4, and CG6) owned by KMF 102. In addition, the single key map includes one or more (in this case one but more can be used if multiple encryption algorithms are used by the KMF) unique key encryption keys (UKEKs) associated with each provisioned K-RSI and used by the communication device to encrypt and decrypt communications with the respective KMF. In this illustrative key map implementation, the UKEK-1 is used for communications with KMF 102, and the UKEK-3 is used for communications with KMF 106. In a further illustrative implementation, although not shown in FIG. 2, the single key map 200 is partitioned in such a way so that the communication device can recognize or determine the set of crypto groups and the one or more UKEK associated with each provisioned KMF RSI.

Illustrated by reference to FIG. 3 is a table 300 that shows an example implementation by a communication device of executing various OTAR key management commands when the communication device is programmed with a single key map architecture. Table 300 includes a column 302 that identifies type of commands (i.e., mandatory or optional OTAR commands), a column 304 that identifies the particular OTAR key management command or action to be taken by the communication device, and a column 306 for the single map architecture that indicates whether a primary KMF (column 308) or a secondary KMF (column 310) issued the key management command listed in column 304.

The particular OTAR key management commands include Change RSI, Changeover, Delete-Key, Hello, Modify-Key, No Service, Rekey, Warm-Start, Zeroize, Capabilities, Delete-Keyset, Deregistration, Inventory, Key-Assignment, Modify-Keyset-Attributes, Registration, Set-Date-Time. It should be noted that the key management commands included in 304 do not necessarily have to be OTAR commands but could be other standard or proprietary key management commands. A designation of "all" corresponding to a key management command or procedure within the table means that the communication device is programmed to allow the KMF to execute this procedure on all crypto groups used by the communication device. A designation of "own" corresponding to a key management command or procedure within the table means that the communication device is programmed to allow the KMF to execute this procedure only on those crypto groups owned by the KMF. A designation of "n/a" corresponding to a key management command or procedure within the table means that the role of primary or secondary KMF is not relevant to the procedure, and it is performed as described in TIA/EIA-102.AACA.

Each of the OTAR key management actions included in column 304 are as defined in TIA/EIA-102.AACA. What should be noted, however, is the particular action that the communication device takes (in accordance with the present teachings) depending upon whether the OTAR key management command comes from a primary KMF for the communication device or a secondary KMF for the communication device. To simplify the present description, the commands shown in column 304 are divided into a "zeroize" command and "non-zeroize" commands The zeroize command is a mandatory OTAR command that is initiated by a KMF, for example, when the communication device is suspected of being lost or compromised, and a communication device receiving a zeroize command acts on a command by deleting or erasing keys stored in the communication device. All other OTAR commands are referred to herein as non-zeroize commands.

As mentioned above and as further shown in FIG. 3, if a communication device receives a zeroize command from a primary KMF, the communication device is programmed to always or unconditionally act upon this command from the primary KMF by erasing the keys stored in each keyset of every crypto group used by the communication device. By contrast, how the communication device acts on a zeroize command from a secondary KMF is conditioned based upon a configuration option setting in the communication device.

More particularly, the communication device has a configuration option that indicates which secondary KMFs (if any) are allowed to perform the zeroize on all crypto groups, since the zeroize command erases all keys in all partitions and memory instances of the communication device. If this configuration option is not set for a particular secondary KMF that sends a zeroize command to the communication device, the communication device either ignores the command or simply deletes the keys only within the keysets owned by that secondary KMF. An alternative method is to provide a reduced-scope zeroize that just deletes the keys (e.g., TEKs and KEKs) associated with the secondary KMF that issued the zeroize command.

Turning back to table 300, with respect to the Changeover, Delete-Key, Modify-Key, Rekey, Delete-Keyset, Key-Assignment, and Modify-Keyset-Attributes key management commands issued by the primary KMF and the secondary KMF, the communication device is at least programmed to act on these commands with respect to keys or keysets in the crypto groups owned by the KMF that issued the command However, the communication device can be, optionally, programmed to act on these same commands with respect to keys or keysets in all the crypto groups used by the communication device regardless of which KMF owns those crypto groups, when the command is issued by the primary KMF for the communication device.

The inventory command can be simplified to allow each KMF (regardless of whether the KMF is designated as primary or secondary) to receive status of all keys for all crypto groups used by the communication device. Moreover, the communication device 108 is programmed to allow the primary KMF to remotely set the time of day within the communication device upon receiving the Set-Date-Time command from the primary KMF by using a timestamp received in a KMM that contains the Set-Date-Time command. Optionally, the communication device includes a configuration option to use the time stamp received from the Set-Date-Time KMM from a secondary KMF. This will override a time stamp previously received from the primary KMF.

Regarding the Warm-Start command, this command implements a procedure that delivers an ephemeral TEK that is used to encrypt a permanent TEK in a follow-on Rekey procedure affected through the Rekey command Once the communication device receives the permanent TEK, it erases the Warm-Start TEK. For multi-KMF operation, in accordance with the present disclosure, the communication device stores the KMF RSI for a given primary or secondary KMF along with the Warm-Start TEK, in case Warm Start procedures from multiple KMFs are occurring concurrently.

Further illustrated with respect to table 300 is the Change RSI command issued by the primary or secondary KMFs. In this regard and in accordance with the present teachings, each KMF (regardless of whether the KMF is designated as primary or secondary, manages its own set of one or more Group RSI (G-RSI), and each G-RSI is associated with a single one of the multiple KMFs used by the communication device. Moreover, the communication device is configured or programmed to allow only the primary KMF to change the key management identifier (e.g., the I-RSI) for the communication device. However, the primary KMF is only allowed to resynchronize individual message numbers (MN) that are associated with its own KMF-RSI and the crypto groups that it owns. The communication device will not allow the secondary KMF to change the I-RSI, but will allow the secondary KMF to resynchronize individual message numbers (MN) that are associated with its own KMF-RSI and the crypto groups that it owns. Accordingly, when the communication device receives the Change RSI command, it will correspondingly change the I-RSI when the command is received from the primary KMF but not when the command is received from a secondary KMF. It should be noted that a suitable procedure should be carried out between the primary and secondary KMFs to communicate to change to the I-RSI.

Additionally, keyset 255 (keyset 15 of CG15 within the key mapping scheme) continues to be reserved for storing KEKs. If the memory map is partitioned, keyset 255 can have partitions for each possible KMF, up to fifteen total. Each partition can store up to 256 KEKs, and the communication device is programmed to determine which KMF uses which KEK partition in its memory map. The KMF is only aware of 256 storage location number (SLNs) for the KEKs, and the communication device provides an offset for storing a new KEK in the appropriate SLN in the memory map. The KEKs for the primary KMF are stored in the first set of partitions in one illustrative implementation. In further implementation of this feature with respect to the single map case, each of the keysets in crypto group 15, of which there are fifteen as defined in the standard, could each map to one or more (in the case where one KMF manages more than one crypto group) traffic key crypto groups. That is, the first keyset in CG15 could be associated with CG0. The KMF that manages CG0 would then store the UKEK and CKEKs (common KEKs) in that keyset, and the communication device would know to retrieve the UKEK and CKEKs for that KMF from that location. Likewise the second keyset in CG15 could be associated to the next set of CGs managed by a different KMF and so forth, up to the fifteen possible KMFs (since there are 15 traffic crypto groups (0-14) possible in the P25 OTAR standard as an example Another option to managing KEKs is to not manage them in the memory map. Instead, the KEKs are stored in memory partitions that are referenced by KMF RSIs. When Inventory for key identifiers is reported, the KMF always knows which keys are KEKs for the primary KMF and which are KEKs for any of the secondary KMFs, when the KEKs are stored in a partitioned Keyset 255. If the KEKs are stored outside of the map, then it is not possible to distinguish the Key IDs for the Primary and Secondary KMFs' KEKs; therefore another mechanism should be used such as creating a new Inventory List Type for KEK key identifiers.

In accordance with a second embodiment of the present disclosure, the communication device associates, within the memory device, each provisioned KMF identifier and its associated sets of crypto groups with a key map, wherein each key map is associated with a different I-RSI for the communication device. In other words, it can be said that the communication device implements a key storage architecture comprising multiple key maps, with each key map corresponding to or associated with a KMF RSI and a with different I-RSI. This second embodiment is illustrated by reference to FIGS. 4 to 6.

Figure 4:
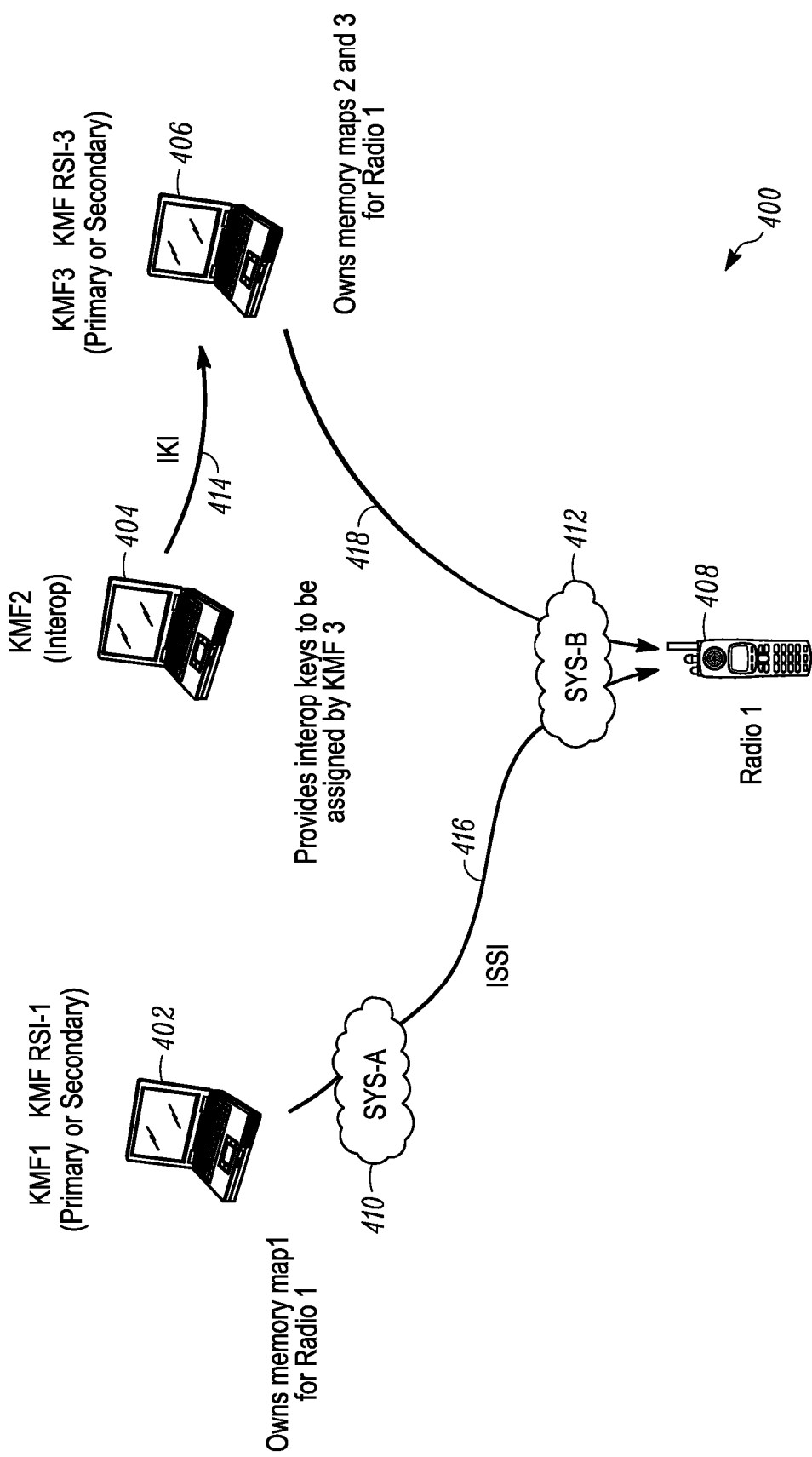
FIG. 4 is a system diagram illustrating a communication device operating with multiple KMFs in accordance with various embodiments.
Figure 5:
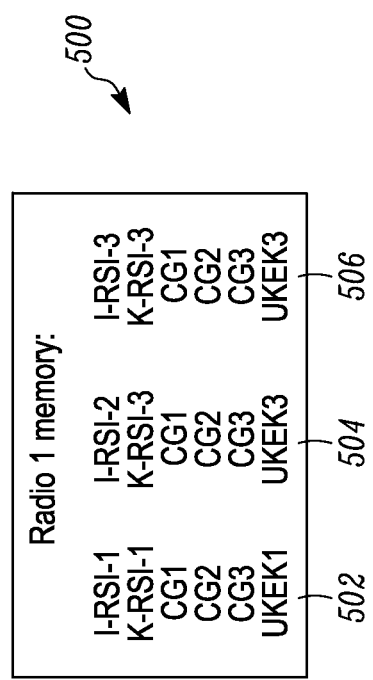
FIG. 5 is a multiple key map structure stored within a communication device to enable the communication device to operate with multiple KMFs in accordance with various embodiments.

FIG. 4 illustrates a communication system 400 that provides a general depiction of a physical implementation of various embodiments of the present disclosure, for example, by reference to FIGS. 5-6. The system 400 includes a KMF1 (402), a KMF2 (404), and a KMF3 (406). A communication device 408 (a radio1) operates with multiple KMFs over a network 410 (SYS-A) and a network 412 (SYS-B), in accordance with the present teachings. KMF 402 is identified by a KMF RSI-1. KMF 404 is identified by a KMF identifier KMF RSI-2, and KMF 406 is identified by a KMF identifier KMF RSI-3.

FIG. 4 is nearly identical to FIG. 1 (with corresponding reference numbers) and the description of FIG. 1 is therefore applicable to FIG. 4 and will not be repeated here for the sake of brevity. One difference between FIG. 1 and FIG. 4 is that FIG. 4 shows the multiple KMFs that communicate directly with the communication device 408 owning separate memory maps that are each associated with a different I-RSI. More particularly, in the architecture shown in FIG. 4, KMF 402 owns, in Radio1, a memory Map 1 and manages and distributes keys for this memory map using key management commands sent in KMMs. KMF 406 owns in Radio1 memory maps 2 and 3 and manages and distributes keys for these memory maps using key management commands sent in KMMs. Stated another way, there isn't a dependency of different instances of the key storage memory on the communication device identifier. Each instance of key memory should be referenced by a unique I-RSI.

For instance, when communication device 408 is within the coverage area of network 410, the communication device 408 wirelessly communicates with the KMF 402 via an RFSS within the network 410. However, once that communication device is within the coverage area of network 412, the communication device 408 wirelessly communicates with the KMF 402 via the RFSS within the network 410 and an RFSS within the network 412, over a P25 ISSI 416. When communication device 408 is within the coverage area of network 412, the communication device 408 wirelessly communicates with the KMF 406 over a link 418 and via the RFSS within the network 412. In the architecture shown in FIG. 4, the KMF 404, does not communicate directly with communication device 408 (i.e., this KMF cannot send KMMs with key management commands directly to the communication device 408) and therefore does not own any memory maps. Instead, the KMF 404 is accordingly termed herein as an "interop" KMF, which provides keys to be assigned by KMF 406 to memory map 3. The KMF 404 provides keys to the KMF 406 over a P25 IKI 414 as defined in the P25 standards.

FIG. 5 illustrates a key map architecture 500 having an instance of three different key maps 502, 504, and 506 provisioned and stored within the communication device 408. Key map 502 is owned by KMF 402, as indicated by the KMF identifier K-RSI-1. Key map 502 is associated with or bound to an I-RSI-1 for the communication device 408 and contains therein crypto groups CG1, CG2, and CG3 and a UKEK 1 for the KMF 402. Key map 504 is owned by KMF 406, as indicated by the KMF identifier K-RSI-3. Key map 504 is associated with or bound to I-RSI-2 for the communication device 408 and contains therein crypto groups CG1, CG2, and CG3 and a UKEK 3 for the KMF 406. Key map 506 is owned by KMF 406, as indicated by the KMF identifier K-RSI-3. Key map 506 is associated with or bound to an I-RSI-3 for the communication device 408 and contains therein crypto groups CG1, CG2, and CG3 and a UKEK 3 for the KMF 406. It should be noted that each key map is associated with or characterized by a different I-RSI even where different key maps are owned by the same KMF. It should also be noted that CG1, CG2, and CG3 are different crypto groups in the three memory maps 502, 504, and 506, even though they are indicated as having the same crypto group identifiers. Accordingly, in this embodiment, each crypto group used by the communication device is owned by only one KMF that directly communicates with the communication device.

Illustrated by reference to FIG. 6 is a table 600 that shows an example implementation by a communication device of executing various OTAR key management commands when the communication device is programmed with a multiple key map architecture. Table 600 includes a column 602 that identifies type of commands (i.e., mandatory or optional OTAR commands), a column 604 that identifies the particular OTAR key management command or action to be taken by the communication device, and a column 606 for the multi-map architecture that indicates whether a primary KMF (column 608) or a secondary KMF (column 610) issued the key management command listed and column 604.

The particular OTAR key management commands include Change RSI, Changeover, Delete-Key, Hello, Modify-Key, No Service, Rekey, Warm-Start, Zeroize, Capabilities, Delete-Keyset, Deregistration, Inventory, Key-Assignment, Modify-Keyset-Attributes, Registration, Set-Date-Time. It should be noted that the key management commands included in 604 do not necessarily have to be OTAR commands but could be other standard or proprietary key management command. A designation of "all" corresponding to a key management command or procedure within the table means that the communication device is programmed to allow the KMF to execute this procedure on all crypto groups used by the communication device. A designation of "own" corresponding to a key management command or procedure within the table means that the communication device is programmed to allow the KMF to execute this procedure only on those crypto groups owned by the KMF. A designation of "n/a" corresponding to a key management command or procedure within the table means that the role of primary or secondary KMF is not relevant to the procedure, and it is performed as described in TIA/EIA-102.AACA Each of the OTAR key management actions included in column 604 are as defined in TIA/EIA-102.AACA. What should be noted, however, is the particular action that the communication device takes (in accordance with the present teachings) depending upon whether the OTAR key management command comes from a primary KMF for the communication device or a secondary KMF for the communication device. As mentioned above and as further shown in FIG. 6, if a communication device receives a zeroize command from a primary KMF, the communication device is programmed to always or unconditionally act upon this command from the primary KMF by erasing the keys stored in each keyset of every crypto group used by the communication device. By contrast, how the communication device acts on a zeroize command from a secondary KMF is conditioned based upon a configuration option setting in the communication device.

More particularly, the communication device has a configuration option that indicates which secondary KMFs (if any) are allowed to perform the zeroize on all crypto groups, since the zeroize command erases all keys in all key maps and memory instances of the communication device. If this configuration option is not set for a particular secondary KMF that sends a zeroize command to the communication device, the communication device either ignores the command or simply deletes the keys only within the keysets owned by that secondary KMF. An alternative method is to provide a reduced-scope zeroize that just deletes the keys associated with the secondary KMF that issued the zeroize command.

Turning back to table 600, with respect to the Changeover, Delete-Key, Modify-Key, Rekey, Warm-Start, Delete-Keyset, Inventory, Key-Assignment, and Modify-Keyset-Attributes key management commands issued by the primary KMF and the secondary KMF, the communication device is programmed to act on these commands with respect to keys or keysets in the key (memory) maps owned by the KMF that issued the command. Moreover, the communication device is programmed to allow the primary KMF to remotely set the time of day within the communication device upon receiving the Set-Date-Time command from the primary KMF by using a timestamp received in a KMM that contains the Set-Date-Time command Optionally, a communication device includes a configuration option to use the time stamp received from the Set-Date-Time KMM from a secondary KMF. This will override a time stamp previously received from the primary KMF.

Further illustrated with respect to table 600 is the Change RSI command issued by the primary or secondary KMFs. In this regard and in accordance with the present teachings, each KMF (regardless of whether the KMF is designated as primary or secondary, manages its own set of one or more G-RSI, and each G-RSI is associated with a single one of the multiple KMFs used by the communication device. Moreover, the communication device is configured or programmed to allow the KMF that owns a particular memory map to change the key management identifier (e.g., the I-RSI) for the communication device for that memory map and correspondingly resynchronize individual MNs that are associated with its own KMF-RSI and the key maps that it owns.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for operating with multiple key management facilities (KMF), the method comprising:
    at a communication device having a memory device:
    receiving a designation of a primary KMF for the communication device, wherein the communication device is configured to act on key management commands from the primary KMF regardless of a registration state of the communication device with the primary KMF, wherein only one primary KMF is designated for the communication device at any given time instance;
    receiving a designation of a secondary KMF for the communication device;
    storing, within the memory device, a first and a second set of crypto groups, wherein each crypto group within each set of crypto groups comprises at least one keyset, wherein each set of crypto groups is associated, within the memory device, to only one KMF identifier;
    associating, within the memory device, the first set of crypto groups to an identifier for the primary KMF;
    associating, within the memory device, the second set of crypto groups to an identifier for the secondary KMF;
    receiving a zeroize command from the secondary KMF;
    determining a configuration option setting for the communication device for acting on the zeroize command sent from the secondary KMF;
    depending on the configuration option setting, acting on the zeroize command by either deleting each key in each keyset in both the first and second sets of crypto groups or only deleting each key in the keysets of the second set of crypto groups;
    receiving a non-zeroize key management command from the primary KMF;
    performing an action only on the first set of crypto groups and not on the second set of crypto groups in response to the non-zeroize key management command;
    receiving a non-zeroize key management command from the secondary KMF; and
    performing an action only on the second set of crypto groups and not on the first set of crypto groups in response to the non-zeroize key management command.

2. The method of claim 1 further comprising the communication device:
    receiving a zeroize command from the primary KMF;
    acting on the zeroize command by deleting each key in each keyset in both the first and second sets of crypto groups.

3. The method of claim 1 further comprising the communication device associating, within the memory device, the first and second sets of crypto groups and the identifiers for the primary and secondary KMFs to a single key management identifier for the communication device.

4. The method of claim 3 further comprising the communication device:
    receiving a first key management command to change the key management identifier for the communication device;
    acting on the first key management command and changing the key management identifier for the communication device only when the first key management command is received from the primary KMF but not when the first key management command is received from the secondary KMF.

5. The method of claim 1 further comprising the communication device:
    associating, within the memory device, the first set of crypto groups and the identifier for the primary KMF to a first key management identifier for the communication device;
    associating, within the memory device, the second set of crypto groups and the identifier for the secondary KMF to a second key management identifier for the communication device.

6. The method of claim 1 further comprising the communication device:
    associating, within the memory device, the identifier for the primary KMF with a first unique key encryption key;
    associating, within the memory device, the identifier for the secondary KMF with a second unique key encryption key.

7. The method of claim 1, wherein the communication device is configured to act on key management commands from the secondary KMF only when registered to the secondary KMF.

8. A method performed at a communication device having a memory device, the method comprising the steps of:
- receiving a designation of a primary KMF for the communication device, wherein the communication device is configured to act on key management commands from the primary KMF regardless of a registration state of the communication device with the primary KMF, wherein only one primary KMF is designated for the communication device at any given time instance;
- receiving a designation of a secondary KMF for the communication device;
- storing, within the memory device, a first and a second set of crypto groups, wherein each crypto group within each set of crypto groups comprises at least one keyset, wherein each set of crypto groups is associated, within the memory device, to only one KMF identifier;
- associating, within the memory device, the first set of crypto groups to an identifier for the primary KMF;
- associating, within the memory device, the second set of crypto groups to an identifier for the secondary KMF;
- receiving a zeroize command from either the primary or the secondary KMF;
- determining whether or not the zeroize command was from the primary or secondary KMF; and
- deleting keys in the first and the second crypto groups if the zeroize command was received from the primary KMF, otherwise only deleting keys in the second crypto group when the zeroize command was received from the secondary KMF.

* * * * *